(No Model.)

M. T. BROWN.
Coffee Roaster.

No. 234,952. Patented Nov. 30, 1880.

Witnesses:
J. Walter Fowler,
Jno. L. Condron.

Inventor:
Maurice T. Brown
per attys
A. H. Evans & Co.

N. PETERS, PHOTO-LITHOGRAPHER, WASHINGTON, D. C.

UNITED STATES PATENT OFFICE.

MAURICE T. BROWN, OF TYLER, TEXAS.

COFFEE-ROASTER.

SPECIFICATION forming part of Letters Patent No. 234,952, dated November 30, 1880.

Application filed May 19, 1880. (No model.)

*To all whom it may concern:*

Be it known that I, MAURICE T. BROWN, of Tyler, Smith county, Texas, have invented certain new and useful Improvements in Coffee-Roasters; and I hereby declare the following to be a full, clear, and exact description thereof, reference being had to the accompanying drawings, making part of this specification, and in which—

Figure 1:
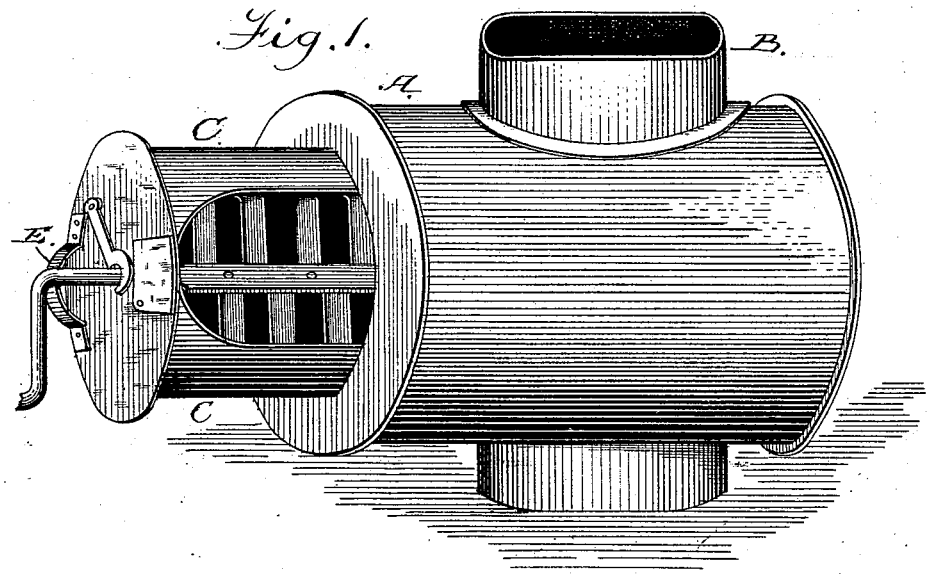
Figure 2:
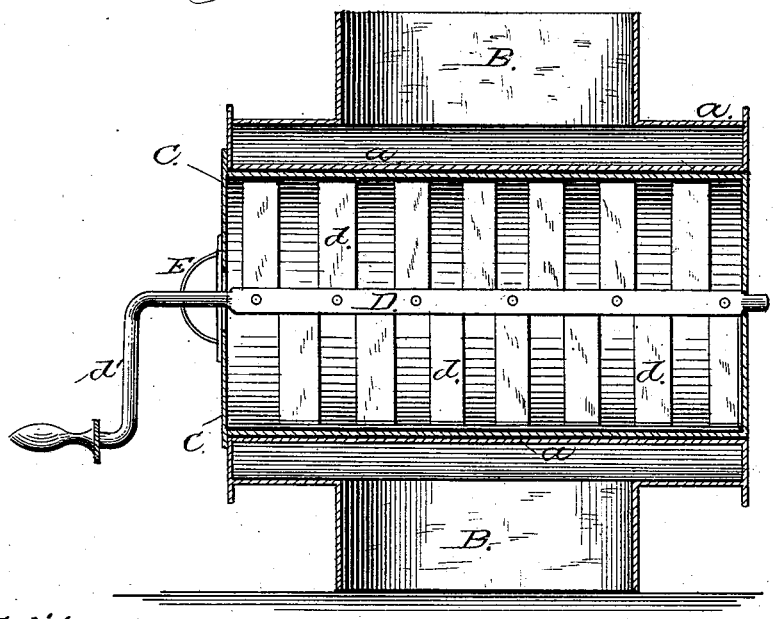

Figure 1 is a perspective view with the roasting-cylinder partially withdrawn. Fig. 2 is a vertical longitudinal section.

The object of my invention is to provide a means whereby I can utilize the heretofore wasted heat ascending the stove-pipe to roast coffee and other similar articles, thereby securing for other purposes the large amount of space over or near the fire heretofore occupied by the coffee-roaster; and the invention consists in a novel construction and arrangement of parts hereinafter described and claimed.

To enable others skilled in the art to make and use my invention, I will proceed to describe the exact manner in which I have carried it out.

In the drawings, A represents an open-ended cylinder or drum composed of two sheet-metal cylinders, $a\ a$, one placed concentrically within the other, leaving a space of several inches between them, which space is closed at both ends. The outer cylinder $a$ is provided with an under and an upper opening, to which are fixed sections of stove-pipe B. These sections are to be connected with the stove-pipe at a convenient point above the fire. Thus the heat and smoke passing up the pipe will circulate all around in the drum, and then pass up and out the pipe.

Within the cylinder A snugly fits the sheet-metal cylinder or roaster C, having an opening to receive the coffee, and the shaft D passing longitudinally through its center, carrying the revolving stirrers or agitators $d$, and operated by the crank $d'$. Handle E at one end is to facilitate sliding it in and drawing it out of the drum A.

The cylinder or roaster C is made of solid metal, except the opening through which the coffee enters and is discharged. The purpose of this is to prevent overheating the coffee by interposing between it and the drum a solid metal surface, and thereby not expose the coffee to the direct heat of the drum, as is the case when these cylinders are made of wire-cloth. As the opening for the coffee is on the side of my cylinder, I am enabled to make the heads of the cylinder solid, so as to close the ends of the drum, and thereby avoid the use of detachable and supplemental heads to the drum.

The operation of the apparatus is as follows: The roaster C, being partially filled with coffee, is placed within the cylinder or drum A, and the coffee is agitated by turning the crank. The smoke and heat from the stove pass into the cylinder, and after circulating around pass out above and up the pipe. This continues until the coffee or other similar article is thoroughly roasted, when the cylinder may be readily withdrawn and the roasted coffee removed.

I am aware that it is not new to place a coffee-roaster within a drum attached to a stove-pipe, and I do not claim the same, broadly.

Having thus described my invention, what I claim as new, and desire to secure by Letters Patent, is—

The coffee-roasting cylinder C, formed of solid metal, and provided with an opening in its side for the passage of the coffee, and having solid ends for closing the drum, in combination with the drum and pipe, substantially as and for the purpose described.

MAURICE T. BROWN.

Attest:
 J. S. LOFTIN,
 R. J. HOUSE.